US012222908B2

United States Patent
Pandis et al.

(10) Patent No.: US 12,222,908 B2
(45) Date of Patent: Feb. 11, 2025

(54) DETECTING IDLE PERIODS AT NETWORK ENDPOINTS FOR MANAGEMENT ACTIONS AT PROCESSING CLUSTERS FOR MANAGED DATABASES

(71) Applicant: Amazon Technologies, Inc., Seattle, WA (US)

(72) Inventors: Ippokratis Pandis, Menlo Park, WA (US); Eric Ray Hotinger, Redmond, WA (US); Bruce William McGaughy, Mercer Island, WA (US); Naresh Chainani, Mountain View, CA (US); Neeraja Rentachintala, San Jose, CA (US); Zhixing Ma, Kirkland, WA (US); Pulkit Jagdishchandra Bhavsar, The Ponds (AU); Chao Duan, Seattle, WA (US); William Michael McCreedy, Berlin (DE); Pavel Sokolov, Menlo Park, CA (US); Sanjay Wangoo, San Ramon, CA (US)

(73) Assignee: Amazon Technologies, Inc., Seattle, WA (US)

( * ) Notice: Subject to any disclaimer, the term of this patent is extended or adjusted under 35 U.S.C. 154(b) by 160 days.

(21) Appl. No.: 17/535,940

(22) Filed: Nov. 26, 2021

(65) Prior Publication Data
US 2023/0169048 A1    Jun. 1, 2023

(51) Int. Cl.
*G06F 16/21*    (2019.01)
*G06F 16/23*    (2019.01)

(52) U.S. Cl.
CPC .......... *G06F 16/21* (2019.01); *G06F 16/2358* (2019.01); *G06F 16/2393* (2019.01)

(58) Field of Classification Search
CPC ... G06F 16/21; G06F 16/2358; G06F 16/2393
See application file for complete search history.

(56) References Cited

U.S. PATENT DOCUMENTS

| 9,229,707 | B2 | 1/2016 | Borissov et al. |
| 10,162,859 | B2 * | 12/2018 | Barsness ........... G06F 16/24545 |
| 10,599,478 | B1 * | 3/2020 | Ghare ..................... G06F 9/505 |
| 10,936,589 | B1 * | 3/2021 | Beitchman ........ G06F 16/24542 |
| 11,055,352 | B1 * | 7/2021 | Beitchman ........ G06F 16/90335 |
| 11,138,232 | B1 * | 10/2021 | Paraschiv ............. G06F 16/182 |
| 11,593,367 | B1 * | 2/2023 | Pandis .............. G06F 16/24539 |

(Continued)

OTHER PUBLICATIONS

U.S. Appl. No. 17/535,446, filed Nov. 24, 2021, Ippokratis Pandis, et al.

(Continued)

*Primary Examiner* — Mark E Hershley
(74) *Attorney, Agent, or Firm* — S. Scott Foster; Kowert, Hood, Munyon, Rankin & Goetzel, P.C.

(57) ABSTRACT

Idle periods may be for management actions at processing clusters for managed databases. A leader node of a processing cluster for a managed database may monitor a network endpoint at a proxy service associated with a database managed by the database service. An idle period for the database may be detected. A management action for the processing cluster may be determined to be performed during the detected idle period. The leader node may cause the determined management action to be performed.

20 Claims, 11 Drawing Sheets

(56) References Cited

U.S. PATENT DOCUMENTS

| | | | |
|---|---|---|---|
| 11,741,096 B1* | 8/2023 | Kanuparthy | G06F 16/9024 |
| | | | 707/716 |
| 12,045,201 B1* | 7/2024 | Satish | G06F 9/542 |
| 2008/0098046 A1 | 4/2008 | Alpern et al. | |
| 2014/0173131 A1* | 6/2014 | Newton | H04L 41/12 |
| | | | 709/240 |
| 2018/0060400 A1* | 3/2018 | Wu | G06F 9/50 |
| 2019/0050298 A1* | 2/2019 | Na | G06F 11/1469 |
| 2020/0050694 A1* | 2/2020 | Avalani | G06F 16/25 |
| 2020/0183859 A1* | 6/2020 | Johns | H04L 67/1097 |
| 2020/0301947 A1 | 9/2020 | Botev et al. | |
| 2021/0089520 A1* | 3/2021 | Oberhofer | G06F 16/252 |
| 2021/0287101 A1* | 9/2021 | Das | G06F 18/217 |
| 2022/0277007 A1* | 9/2022 | Jaiswal | G06F 9/4856 |
| 2023/0161792 A1* | 5/2023 | Pandis | G06F 16/24542 |
| | | | 707/718 |
| 2023/0164397 A1* | 5/2023 | Bai | H04L 67/06 |
| | | | 709/231 |

OTHER PUBLICATIONS

U.S. Appl. No. 17/547,831, filed Dec. 10, 2021, Gaurav Saxena, et al.

International Search Report and Written Opinion mailed Mar. 20, 2023 in International Application No. PCT/US2022/080421, Amazon Technologies, Inc., pp. 1-12.

Gupta Anurag, et al, "Amazon Redshift and the Case for Simpler Data Warehouses", Proceedings of the 2015 ACM SIGMOD international conference on management of data (SIGMOD '15), pp. 1917-1923, May 27, 2015, ACM Press, New York, New York, USA.

Le Pape, Cecile, et al: "Replica Refresh Strategies in a Database Cluster", High Performance Computing for Computational Science—VECPAR 2006: 7th International Conference, Rio de Janeiro, Brazil, Jun. 10-13, 2006, pp. 679-691, Revised Selected and Invited Papers 7, Springer Berlin Heidelberg, 2007.

* cited by examiner

DETECTING IDLE PERIODS AT NETWORK ENDPOINTS FOR MANAGEMENT ACTIONS AT PROCESSING CLUSTERS FOR MANAGED DATABASES

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information.

New technologies more and more seek to reduce both the complexity and storage requirements of maintaining data while simultaneously improving the efficiency of data processing. For example, data processing resources may be efficiently configured to perform different workloads. However, given that many workloads are unknown when data processing resources are configured, or change over time. Challenges in obtaining the right configuration of data processing resources occur frequently.

Figure 1:
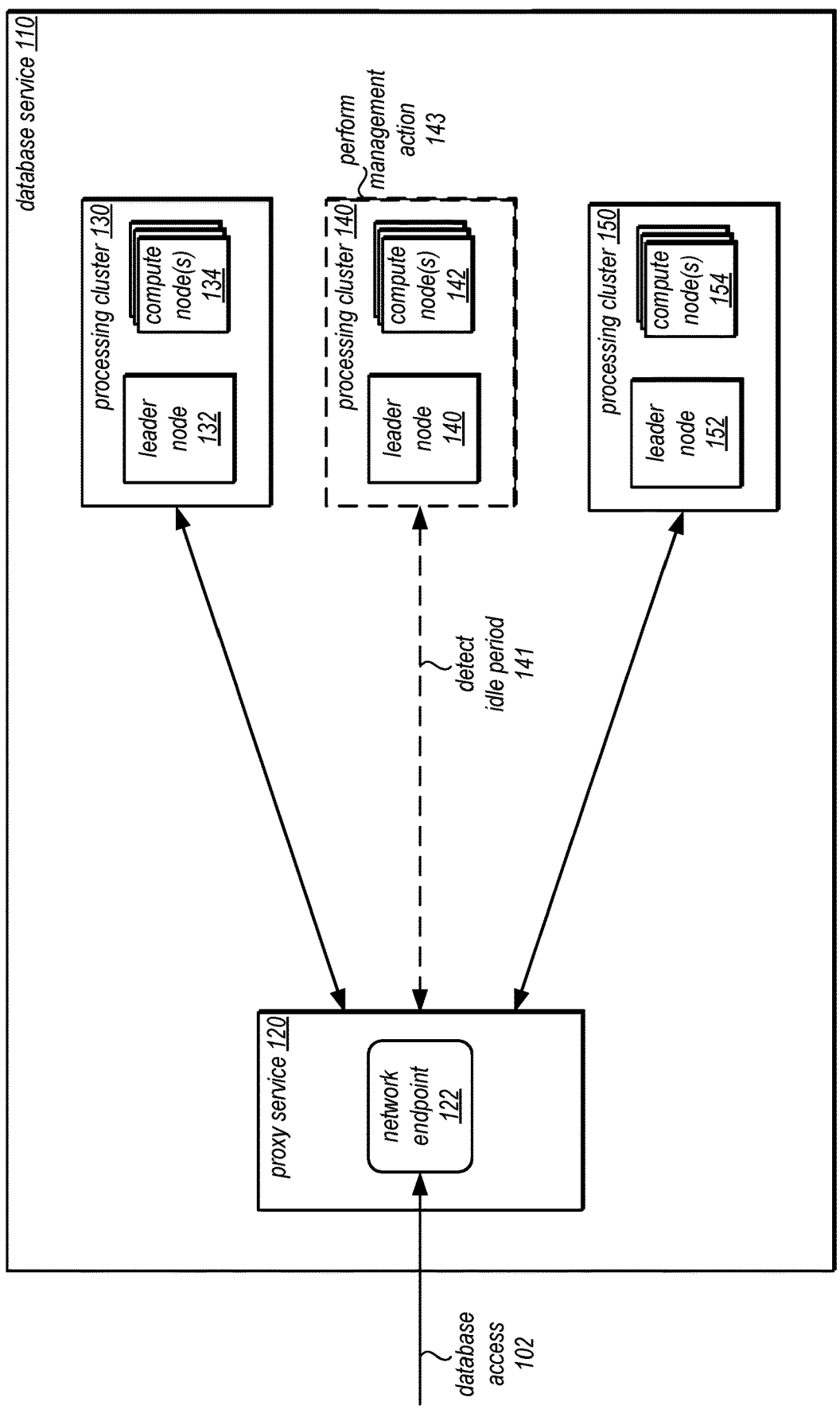
FIG. 1 illustrates a logical block diagram of detecting idle periods for management actions at processing clusters for managed databases, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of detecting idle periods for management actions at processing clusters for managed databases are described herein. While database systems that are operated and managed directly by the entities using the database systems may be able to make adjustments to database system configurations for query workloads, cloud service providers and other provider networks that offer database services that operate and manage database systems on behalf of other entities that utilize the database systems may have less insight into the changes in query workload. For instance, many entities that utilize database systems find it desirable to shift operational and management responsibilities to the provider of a database service in order to focus efforts on other tasks. This shift of responsibility to a provider of a database service may cause database services to make management decisions for a database based on unknown information, such as expected query workloads or changes to query workloads.

For example, entities that use database systems may be able to shut-down or limit resource waste by shutting down, hibernating, or otherwise not operating database systems that are not being used. These entities could also use these known idle periods in order to perform various actions to manage the database system (e.g., actions that upgrade, patch, reorganize, or modify the operation of the database system to achieve various improvements or correct various problems). Providers of managed databases, however, may not have foreknowledge of these idle periods. Techniques for detecting idle periods for management actions at processing clusters for managed databases may be implemented to allow providers that managed database systems to proactively detect and utilize idle periods to improve the performance of managed database systems without causing downtime or other service interruptions in the event the database system is to be used.

FIG. 1 illustrates a logical block diagram of detecting idle periods for management actions at processing clusters for managed databases, according to some embodiments. Database service 110 may be a stand-alone database service, in various embodiments. For example, database service 110 may be implemented for private use (e.g., on private networks and resources for entity-specific utilization). In some embodiments, database service 110 may be implemented as part of multiple different services provided by a cloud service provider, such as provider network 200 discussed in detail below with regard to FIG. 2.

Database service 110 may manage databases on behalf of clients of database service 110, in various embodiments. For example, database service 110 may implement an interface that allows users to create a database to be hosted in database service 110. The interface may also allow users to specify whether the database is to be managed by the database service, automatically, in a "serverless" fashion (e.g., by allowing database service 110 to automatically determine and configure an appropriate number of computing resources to host and provide access to (e.g., query) the database). In some embodiments, database service 110 may also allow for hosted databases to be manually managed (e.g., via interface requests to configure a specified number of computing resources to host and provide access to (e.g., query) the database).

For database service managed databases, database service 110 may implement proxy service 120. Proxy service 120, which may be similar to proxy service 240 discussed in detail below with regard to FIG. 2, may host or implement a network endpoint 122, which may be used to provide database access 102 to a database managed by database service 110. Instead of direct access, a client application utilizing a managed database may send requests to a common network endpoint 122 associated with the database. Proxy service 120 may implement various techniques, including load balancing, scaling, and other techniques for managing and providing efficient query performance and route queries and other access requests (e.g., requests to write to the database) to a processing cluster 130 for performance. Note that in some embodiments, a primary processing cluster for a database may act as a proxy for other processing clusters attached or otherwise assigned to handling database access 102. thus, the various features discussed above with regard to proxy service 120 may be implemented instead on a primary processing cluster (e.g., at a leader node for the primary processing cluster).

Processing clusters, such as processing cluster 130, 140, and 150, may implement distributed query and other access request processing frameworks to access data in a database hosted by database service 110, as discussed in detail below with regard to FIG. 7. Processing clusters may include a leader node to plan and direct execution of requests, such as leader nodes 132, 142, and 152, and compute node(s) to perform various data operations to execute the requests, such as compute node(s) 134, 144, and 154.

Over time, processing clusters may encounter various scenarios where different management actions may be desirable to perform in order to improve performance of the processing cluster, which may then improve the performance of client applications that utilize processing clusters in order to access the managed database. Instead of waiting for client-specified actions (e.g., instructions, commands or other requests sent by a client) to perform various management actions, processing clusters may detect an idle period in order to perform a management action during the idle period. For example, leader node 140 may implement techniques to monitor for idle periods at network endpoint 122, as discussed in detail below with regard to FIGS. 3 and 8. In this way, during the idle period, leader node 140 may perform one (or more) management actions 143.

Figure 4:
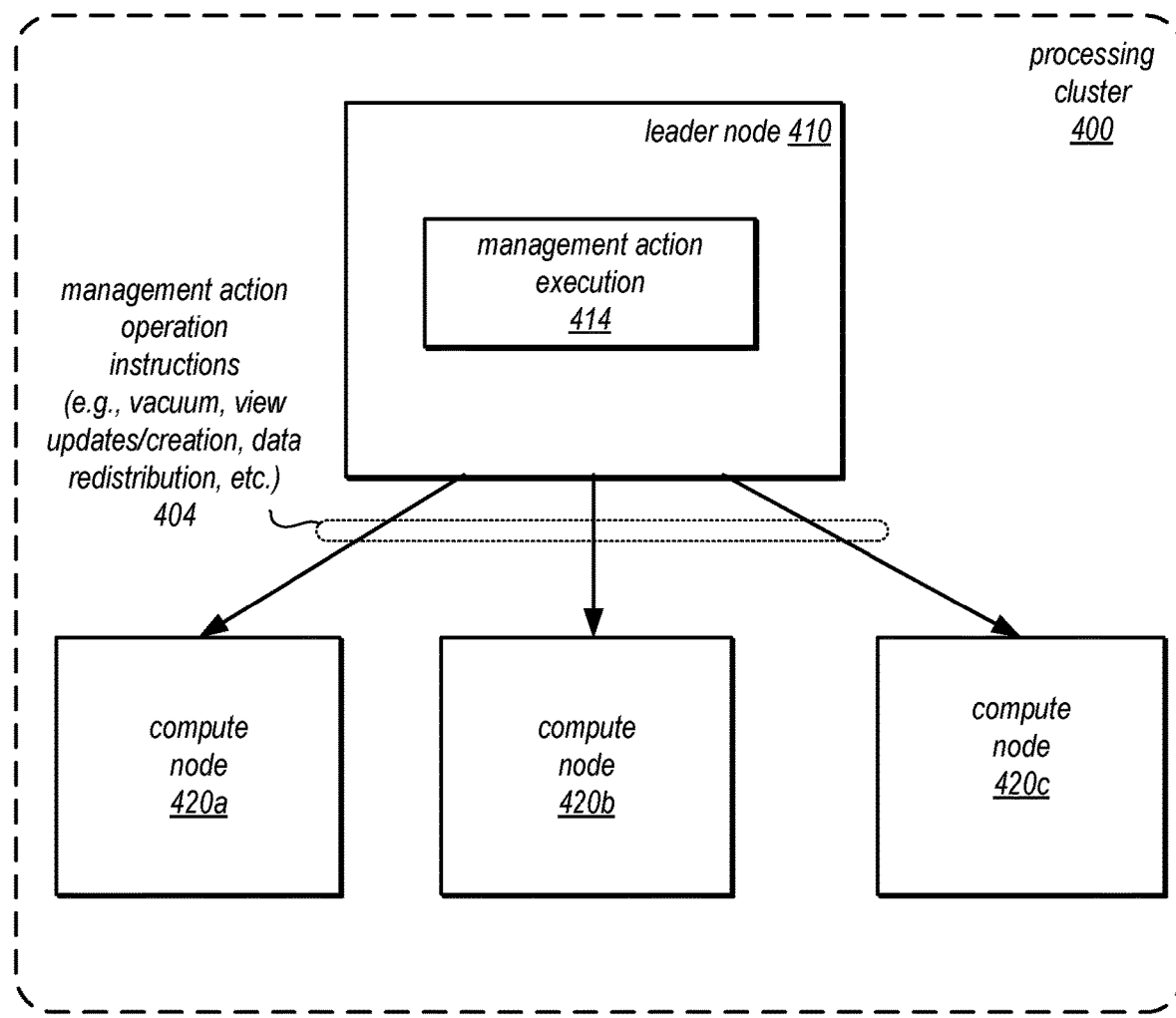
FIG. 4 is a logical block diagram illustrating performing a management action at a processing cluster, according to some embodiments.
Figure 5:
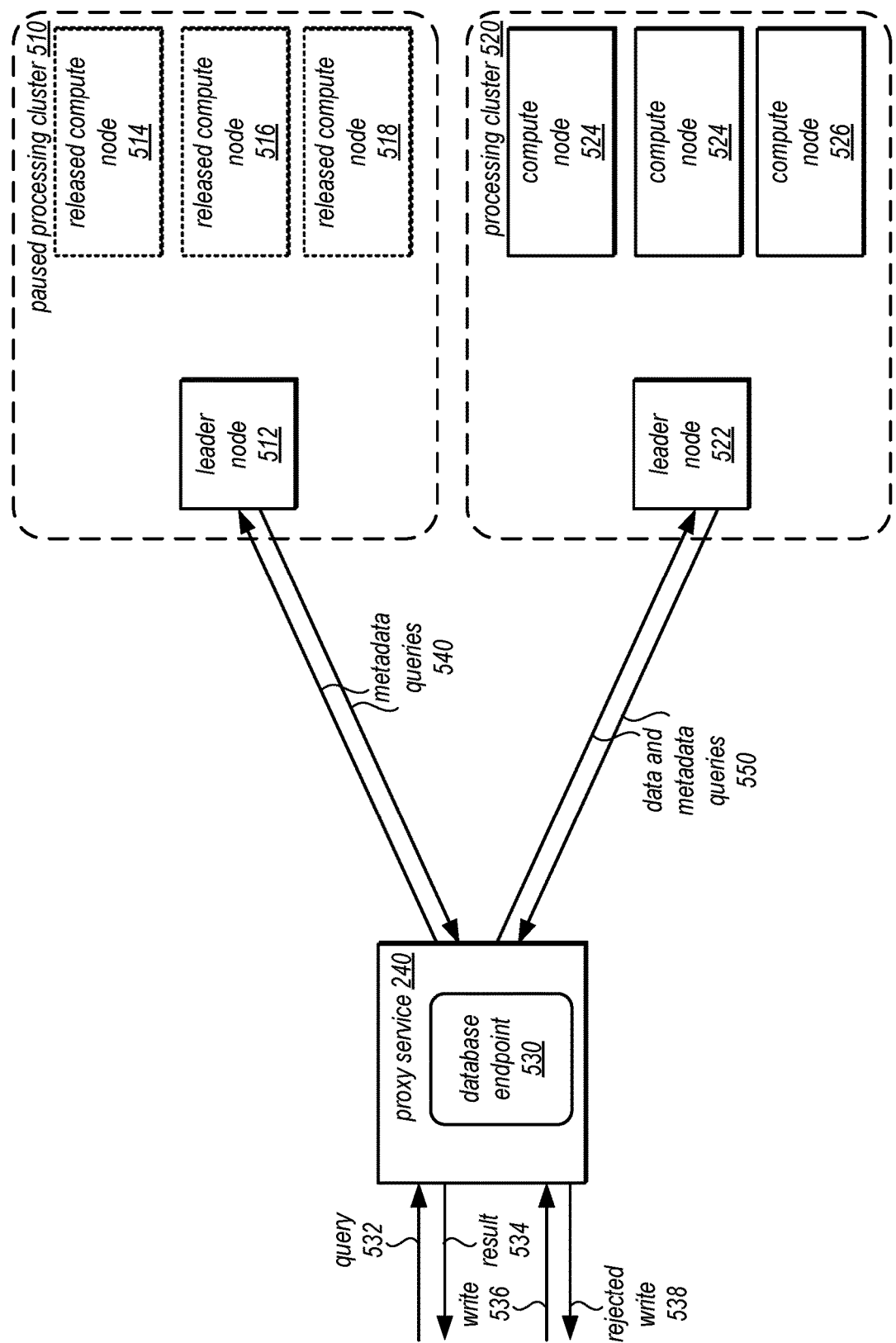
FIG. 5 is a logical block diagram illustrating an example of query handling with a paused processing cluster for a managed database, according to some embodiments.

Management actions may take various forms and provide many different performance enhancements, improvements, or resource conservation measures, as discussed in detail with regard to FIGS. 4 and 5. For example, one management action may be an action to pause, and stop work of the processing cluster. Allowing resources, such as compute nodes 142 to perform other work for database service 110. Processing cluster may 140 can later resume, as discussed in detail below with regard to FIGS. 5 and 9. Other management actions can include various operations to improve the processing cluster operations (e.g., through software patches or other modifications) or improve the performance of the managed database, such as by performing data operations to clean-up, re-distribute, pre-generate views, or other actions that may make data more efficiently accessible for processing future queries.

Please note that the previous description of a database service is a logical description and thus is not to be construed as limiting as to the implementation of a database service, proxy service, processing clusters, or portions thereof.

This specification continues with a general description of a provider network that implements multiple different services, including a database service and storage service, which may implement detecting idle periods for management actions at processing clusters for managed databases. Then various examples of the database service and storage service, including different components/modules, or arrangements of components/module that may be employed as part of implementing the services are discussed. A number of different methods and techniques to implement detecting idle periods for management actions at processing clusters for managed databases are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
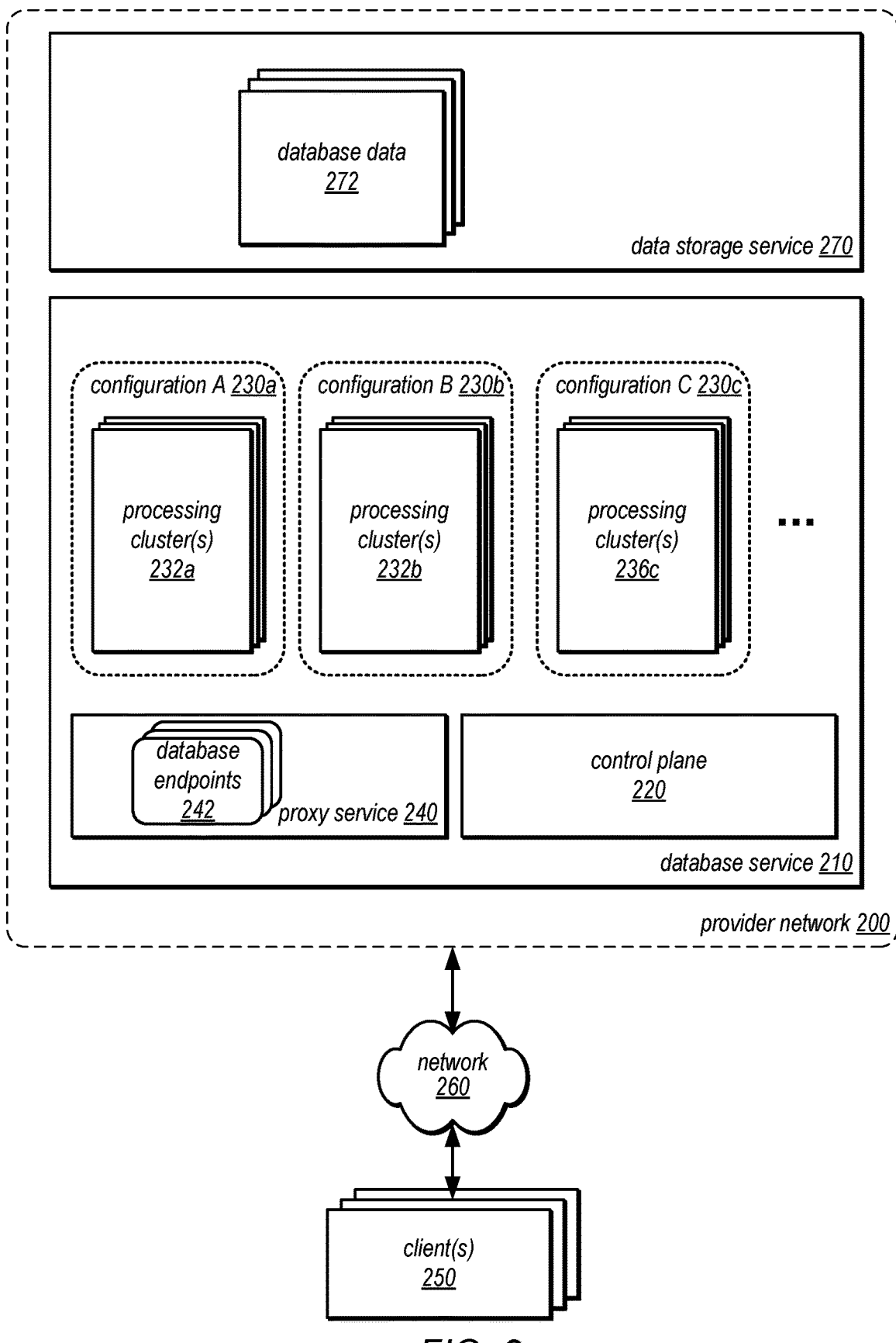
FIG. 2 is a logical block diagram illustrating a provider network offering a database service that detects idle periods for management actions at processing clusters for databases managed by the database service, according to some embodiments.

FIG. 2 is a logical block diagram illustrating a provider network offering a database service that detects idle periods for management actions at processing clusters for databases managed by the database service, according to some embodiments. Provider network 200 may be a private or closed system or may be set up by an entity such as a company or a public sector organization to provide one or more services (such as various types of cloud-based storage) accessible via the Internet and/or other networks to clients 250.

Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. The provider network 200 can be formed as a number of regions, where a region is a separate geographical area in which the cloud provider clusters data centers. Each region can include two or more availability zones connected to one another via a private high speed network, for example a fiber communication connection.

An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may implement various computing resources or services, such as database service(s) 210, (e.g., relational database services, non-relational database services, a map reduce service, a data warehouse service, and/or other large scale data processing services or various other types database services), data storage service 270 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of database service 210 or data storage service 270) may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., anomaly detection, machine learning, data mining, big data querying, or any other type of data processing operation). For example, in at least some embodiments, database services 210 may include a map reduce service that creates clusters of processing nodes that implement map reduce functionality over data stored in the map reduce cluster as well as data stored in data storage service 270. In another example, database service 210 may include various types of database services (both relational and non-relational) for storing, querying, and updating data. Such services may be enterprise-class database systems that are highly scalable and extensible. Queries may be directed to a database in data database service 210 that is distributed across multiple physical resources, and the database system may be scaled up or down on an as needed basis.

Database service 210 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, database service 210 may implement, in some embodiments, a data warehouse service, that utilizes another data processing service, to execute portions of queries or other access requests with respect to data that is stored in a remote data store, such as data storage service(s) 270 (or a data store external to provider network 200) to implement distributed data processing for distributed data sets.

In at least some embodiments, database service 210 may be a data warehouse service. Thus in the description that follows database service 210 may be discussed according to the various features or components that may be implemented as part of a data ware house service, including control plane 220, proxy service 240, and processing clusters 232. Note that such features or components may also be implemented in a similar fashion for other types of database services and thus the following examples may be applicable to other types of database service 210. Database service 210 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where database service 210 is a data warehouse service, the data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system implemented as a data warehouse. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 10. Different subsets of these computing devices may be controlled by control plane 220. Control plane 220, for example, may provide a cluster control interface to clients or users who wish to interact with the processing clusters, such as processing cluster(s) 232a, 232b, and 232c managed by control plane 220. For example, control plane 220 may generate one or more graphical user interfaces (GUIs) for clients, which may then be utilized to select various control functions offered by the control interface for the processing clusters 232 hosted in the database service 210. Control plane 220 may provide or implement access to various metrics collected for the performance of different features of database service 210, including processing cluster performance, in some embodiments.

As discussed above, various clients (or customers, organizations, entities, or users) may wish to store and manage data using a database service 210. Processing clusters 232 may respond to various requests, including write/update/store requests (e.g., to write data into storage) or queries for data (e.g., such as a Server Query Language request (SQL) for particular data), as discussed below with regard to FIGS. 3 and 5. For example, multiple users or clients may access a processing cluster to obtain data warehouse services.

For databases manually managed by users, database service 210 may provide network endpoints directly to the clusters which allow the users manage in order to implement client applications that send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters.

In at least some embodiments, database service 210 may implement proxy service 240 to provide access to databases (e.g., data warehouses) hosted in database service 210. For databases managed by database service 210, database service 210 may provide database endpoints 242 (e.g., network endpoints) for a hosted database. Database endpoints 242 may not provide direct access to a particular processing cluster 232, as the processing cluster used to respond to such requests (e.g., queries) may change according to various scaling techniques. Instead, client applications may utilize the database endpoint 242 for a database to be included in various client applications or other communications for database access so that proxy service 240 can direct the requests to the appropriate processing cluster without the client application having to be altered every time a change in processing cluster (e.g., scaling operations) are performed by database service 210. In this way, database service 210 can perform scaling and other management operations without interfering with client applications.

Processing clusters, such as processing clusters 232a, 232b, and 232c, hosted by database service 210 may provide an enterprise-class database query and management system that allows users to send data processing requests to be executed by the clusters 232, such as by sending a query. Processing clusters 232 may perform data processing operations with respect to data stored locally in a processing cluster, as well as remotely stored data. For example, data storage service 270 implemented by provider network 200 that stores remote data, such as backups or other data of a database stored in a cluster. In some embodiments, database data 272 may not be stored locally in a processing cluster 232 but instead may be stored in data storage service 270 (e.g., with data being partially or temporarily stored in processing cluster 232 to perform queries). Queries sent to a processing cluster 23 (or routed/redirect/assigned/allocated to processing cluster(s)) may be directed to local data stored in the processing cluster and/or remote data. Therefore, processing clusters may implement local data processing, such as local data processing, (discussed below with regard to FIG. 5) to plan and execute the performance of queries with respect to local data in the processing cluster, as well as a remote data processing client.

Database service 210 may implement different types or configurations of processing clusters. For example, different configurations A 230*a*, B 230*b*, and C 230*c*, may utilize various different configurations of computing resources, including, but not limited to, different numbers of computational nodes, different processing capabilities (e.g., processor size, power, custom or task-specific hardware, such as hardware accelerators to perform different operations, such as regular expression searching or other data processing operations), different amounts of memory, different networking capabilities, and so on. Thus, for some queries, different configurations 230 of processing cluster 232 may offer different execution times. Different configurations 230 of processing clusters 232 may be maintained in different pools of available processing clusters to be attached to a database. Attached processing clusters may then be made exclusively assigned or allocated for the use of performing queries to the attached database, in some embodiments. The number of processing clusters 232 attached to a database may change over time according to the selection techniques discussed below.

In some embodiments, database service 210 may have at least one processing cluster attached to a database, which may be the "primary cluster." Primary clusters may be reserved, allocated, permanent, or otherwise dedicated processing resources that store and/or provide access to a database for a client, in some embodiments. Primary clusters, however, may be changed. For example, a different processing cluster may be attached to a database and then designated as the primary database (e.g., allowing an old primary cluster to still be used as a "secondary" processing cluster or released to a pool of processing clusters made available to be a attached to a different database). Techniques to resize or change to a different configuration of a primary cluster may be performed, in some embodiments, such as the pause and resume techniques discussed below with regard to FIG. 6B. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity in addition to that provided by a primary cluster. Control plane 220 may manage cluster pools by managing the size of cluster pools (e.g., by adding or removing processing clusters based on demand to use the different processing clusters).

As databases are created, updated, and/or otherwise modified, snapshots, copies, or other replicas of the database at different states may be stored separate from database service 210 in data storage service 250, in some embodiments. For example, a leader node, or other processing cluster component, may implement a backup agent or system that creates and store database backups for a database to be stored as database data 272 in data storage service 270. Database data 272 may include user data (e.g., tables, rows, column values, etc.) and database metadata (e.g., information describing the tables which may be used to perform queries to a database, such as schema information, data distribution, range values or other content descriptors for filtering out portions of a table from a query, a superblock, etc.). A timestamp or other sequence value indicating the version of database data 272 may be maintained in some embodiments, so that the latest database data 272 may, for instance, be obtained by a processing cluster in order to perform queries. In at least some embodiments, database data 272 may be treated as the authoritative version of data, and data stored in processing clusters 232 for local processing as a cached version of data.

Data storage service 270 may implement different types of data stores for storing, accessing, and managing data on behalf of clients 250 as a network-based service that enables clients 250 to operate a data storage system in a cloud or network computing environment. Data storage service(s) 270 may also include various kinds of object or file data stores for putting, updating, and getting data objects or files. For example, one data storage service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 270 may be treated as a data lake. For example, an organization may generate many different kinds of data, stored in one or multiple collections of data objects in a data storage service 270. The data objects in the collection may include related or homogenous data objects, such as database partitions of sales data, as well as unrelated or heterogeneous data objects, such as audio files and web site log files. Data storage service(s) 270 may be accessed via programmatic interfaces (e.g., APIs) or graphical user interfaces. For example, format independent data processing service 220 may access data objects stored in data storage services via the programmatic interfaces.

Generally speaking, clients 250 may encompass any type of client that can submit network-based requests to provider network 200 via network 260, including requests for storage services (e.g., a request to query a database service 210, or a request to create, read, write, obtain, or modify data in data storage service(s) 270, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database service(s) 210 or storage resources in data storage service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 270 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service).

Clients 250 may convey network-based services requests (e.g., access requests to read or write data may be directed to data in data storage service(s) 270, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210 and/or data storage service(s) 270 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Figure 3:
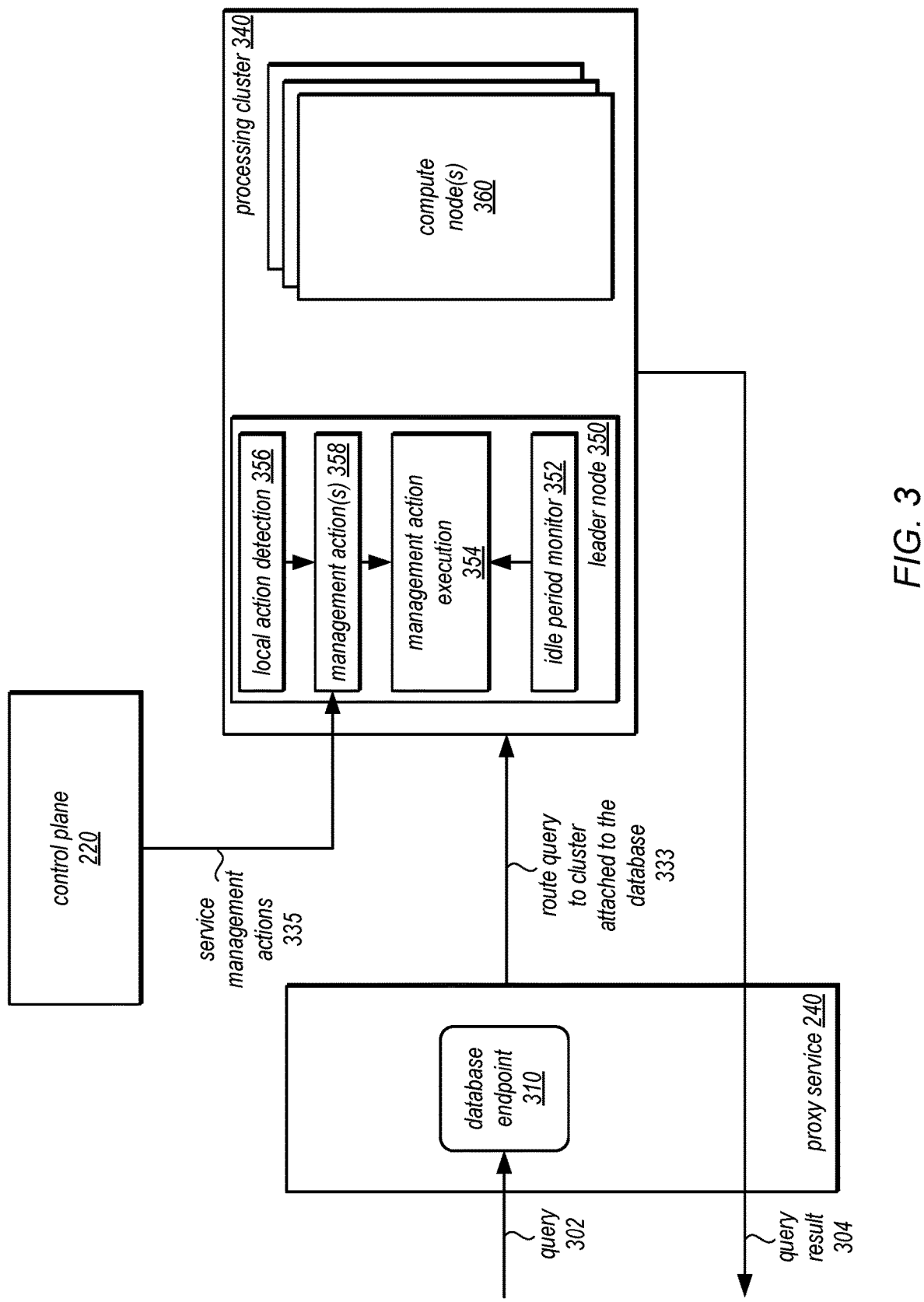
FIG. 3 is a logical block diagram of monitoring for idle periods at network endpoints at a leader node of a processing cluster for performing management actions, according to some embodiments.

FIG. 3 is a logical block diagram of monitoring for idle periods at network endpoints at a leader node of a processing cluster for performing management actions, according to some embodiments. As indicated at 302, a query may be received at proxy service 240 via database endpoint 310. For example, query 302 may be sent to a network address or other location specific to a database managed by database service 210. Proxy service 240 may implement one or more components to listen for queries, like query 302, at database endpoint 310.

In various embodiments, proxy service 240 may implement a database query queue (not illustrated). The database query queue may be a queue of queries directed to a same database, in various embodiments. For example, queries directed to different databases may be received via different database endpoints and put into different respective database query queues (as opposed to being comingled in a common queue). The database query queue may be a database-wide query queue, separate from any workload or other queues implemented on attached processing clusters for the database. Queries, like query 302, may then be pulled from the database query queue and routed 333 by query routing (e.g., according to a First In First Out (FIFO) order) to an attached processing cluster, such as processing cluster 340.

Proxy service 240 may then implement various techniques in order to make routing decisions that scale the processing clusters attached to the database in accordance with optimizing both query performance and processing cluster utilization. For example, response time predictions may be determined for any attached processing clusters as well as another other processing cluster configurations that may be attached (but are not currently attached), based on the predicted execution time of a cluster (e.g., which may be predicted by machine learning models or statistical analysis of previous queries), bootstrap time (e.g., an amount of time to prepare and attach a new processing cluster to serve a query), and queue time (e.g., time a query may be queued at a processing cluster while other queries are performed before being performed by that processing cluster). Proxy service 240 may route the query to an attached processing cluster 340 to the database, as indicated at 333, which may perform the query and return a result 304.

Processing cluster 340 may implement leader node 350 and compute nodes 360 to handle queries and other routed requests, as discussed in detail below with regard to FIG. 5. Leader node 350 may also implement idle period monitor 352 in order to detect an idle period for the database at database endpoint 310. For example, idle period monitor 352 may evaluate session state information, cursor movement, or various other indications of activity for a client of the database. Different types of idleness may be detected for different management actions, in some embodiments (e.g., different lengths or indicators of idleness). For example, different sets of criteria may be considered for different management actions (or categories of management actions). Thus, idle periods detected may have different idle period types corresponding to the set of criteria used to detect an idle period. Idle periods may be reported to management action execution 354.

Management action execution 354 may determine what management actions to perform during an idle period based on the actions stored or indicated in management actions 358 (e.g., a queue or other data structure indicating the management actions to be performed. Local action detection 356, for example, may detect actions that can be detected locally. For example, one such local action may be an action to vacuum or clean up storage (e.g., performing one more data block movements to consolidate storage space left as a result of deletions performed at the database) based on a time since a last vacuum, fragmentation measures, or various other indicators of need for storage clean up (e.g., a number of writes to the database). Another example of a location action may be an action to re-distribute data to improve query performance (e.g., by identifying and utilizing a different data distribution scheme for the processing cluster, such as utilizing a different one (or more) columns as a new distribution key for the database), which may be detected based on an amount of data shuffled between compute nodes of a processing cluster or other indicators of data that is to be joined that is not located together. Another example of a local action may be an action to generate views or other pre-computed results that can improve query performance. For example, previously received queries can be examined to detect commonly queried results. Such queries can be used to generate an internal materialized view which can then be used to perform a subsequent query. Another local action may be to pause processing cluster 340 in order to reduce processing costs for database service 210 and clients that utilize the processing cluster, as discussed in detail below with regard to FIGS. 5-6B. Pauses may also allow for resizing and other cluster reconfiguration, in some embodiments.

Control plane 220 may also indicate service management actions 335 to management actions 358, such as software patch installations, network configuration changes (e.g., update security rules) or other configuration changes for security or other operations. For example, control plane 220 can coordinate the performance of patch installations across a fleet of host systems implementing processing clusters, by staggering installation instructions as different service management actions 335 that can be applied by a processing cluster 340 when an idle period is detected (and by an update deadline specified by control plane 220).

Different management actions may be taken in different ways. FIG. 4 is a logical block diagram illustrating performing a management action at a processing cluster, according to some embodiments. For example, in processing cluster 400, leader node 410 may utilize management action execution 414 to provide various instructions 404 to compute nodes 420a, 420b, and 420c. Such instructions may include operations to perform storage vacuum (e.g., defragment or packing data records together to remove gaps or spaces after record deletions), perform view updates or create new views (e.g., to proactively create or update materialized views that are likely to be accessed by having compute nodes 420 query and update a view in storage), data re-distribution (e.g., changing a distribution key or other schema for distributing data amongst compute nodes 420 by shuffling or moving portions of database data around), among other management actions. In some embodiments, management action operation instructions 404 may include instructions to perform control plane initiated management actions (e.g., to execute scripts, install patches, or perform other changes).

Another type of management action may include pausing processing clusters. Paused processing clusters may allow for computing resources, such as compute nodes to be released to do other tasks for database service 210. In this way, customer of database service 210 can achieve cost savings because the resources do not have to be retained and not used, as well as database service 210, which can more efficiently utilize computing resources.

Paused processing clusters, however, do not interfere with the ability of client applications to access managed databases. FIG. 5 is a logical block diagram illustrating an example of query handling with a paused processing cluster for a managed database, according to some embodiments. Proxy service 240 may implement database endpoint 530 which may provide access to paused processing cluster 510 and processing cluster 520, each of which may have respective leader nodes, 512 and 522, and compute nodes 514, 516, 518, 522, 524, and 526.

Database endpoint 530 may still provide access to the managed database even though processing cluster 510 is paused. For example, queries, such as query 532 can still be accepted and routed either to paused processing cluster (as leader node 512 is still available and can answer metadata queries 540 about the managed database), or either data or metadata queries 550 can be sent to processing cluster 520 and answered by leader node 522. A result 534 can then be returned in response. Write requests, such as write 536, which may insert, modify, or delete data, however, may be rejected, as indicated at 538 in order to prevent one processing cluster from creating a version of the database inconsistent with another version in paused processing cluster 510.

Figure 6A:
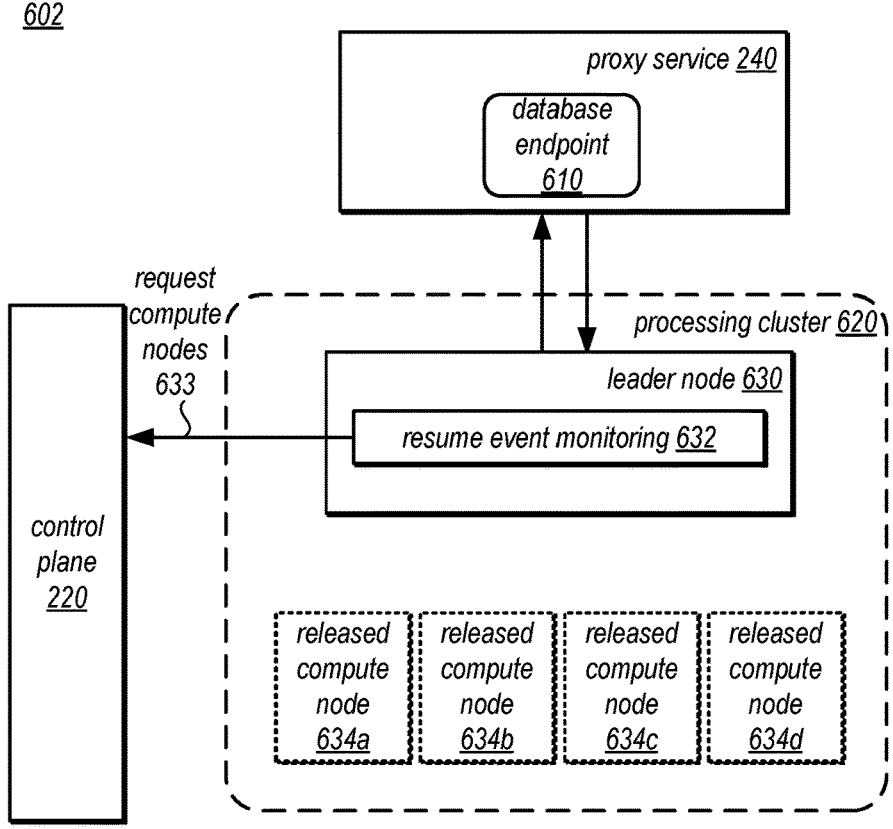
FIGS. 6A-6B are logical block diagram illustrating examples of resuming from pause at a processing cluster, according to some embodiments.
Figure 6A:
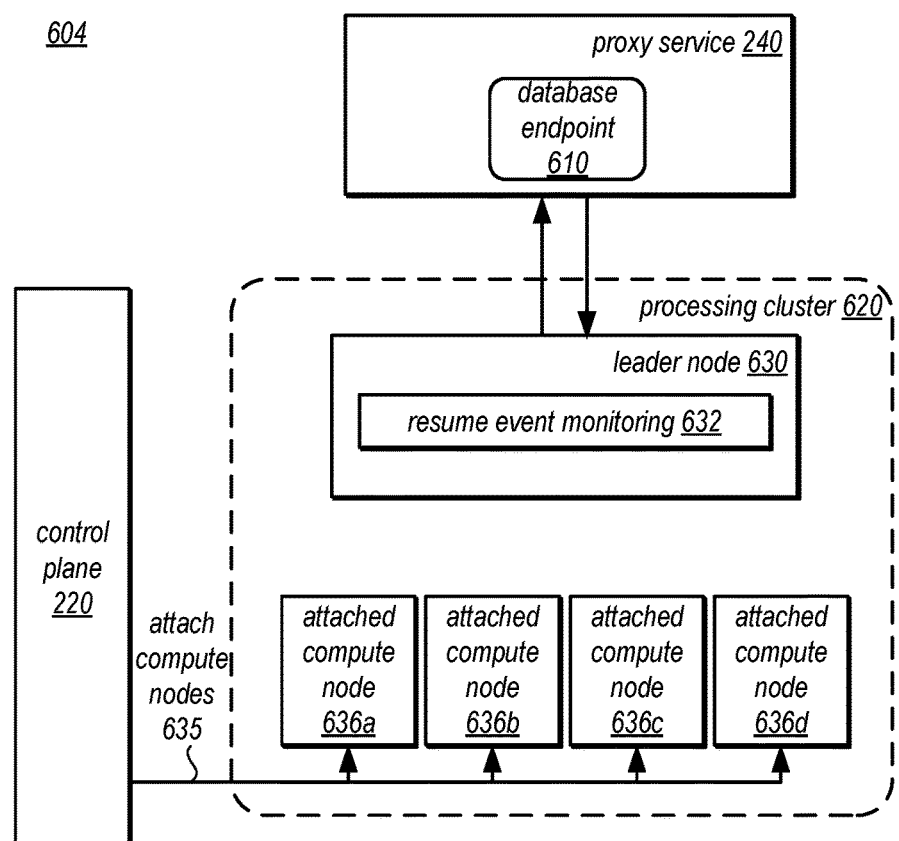

FIG. 6A is a logical block diagram illustrating an example of resuming from pause at a processing cluster, according to some embodiments. For example, in scene 602, processing cluster 620 may implement leader node 630, which may implement resume event monitoring (implementing techniques discussed below with regard to FIG. 9). As indicated at 634a, 634b, 634c, and 634d, a number of released compute nodes may have been previously implemented as part of processing cluster 620. Resume event monitoring 632 may send a request to obtain compute nodes, as indicated at 633. Control plane 220, as indicated in scene 604 may provide a same number of compute nodes to be attached, as indicated at 635 (attached nodes 636a, 636b, 636c, and 636d).

Figure 6B:
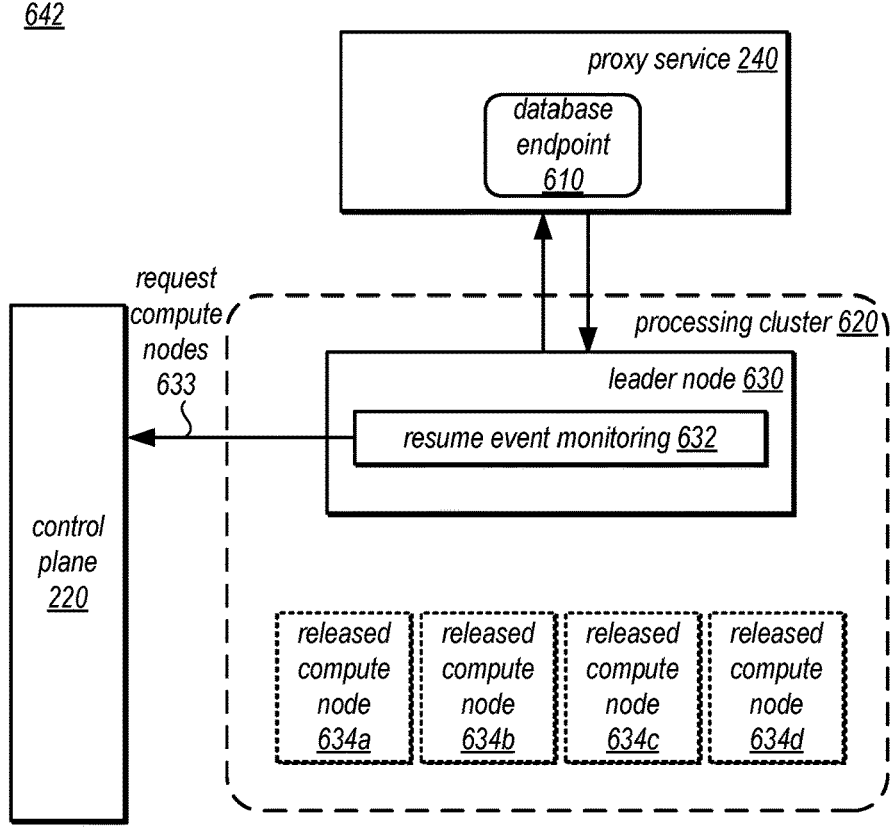
Figure 6B:
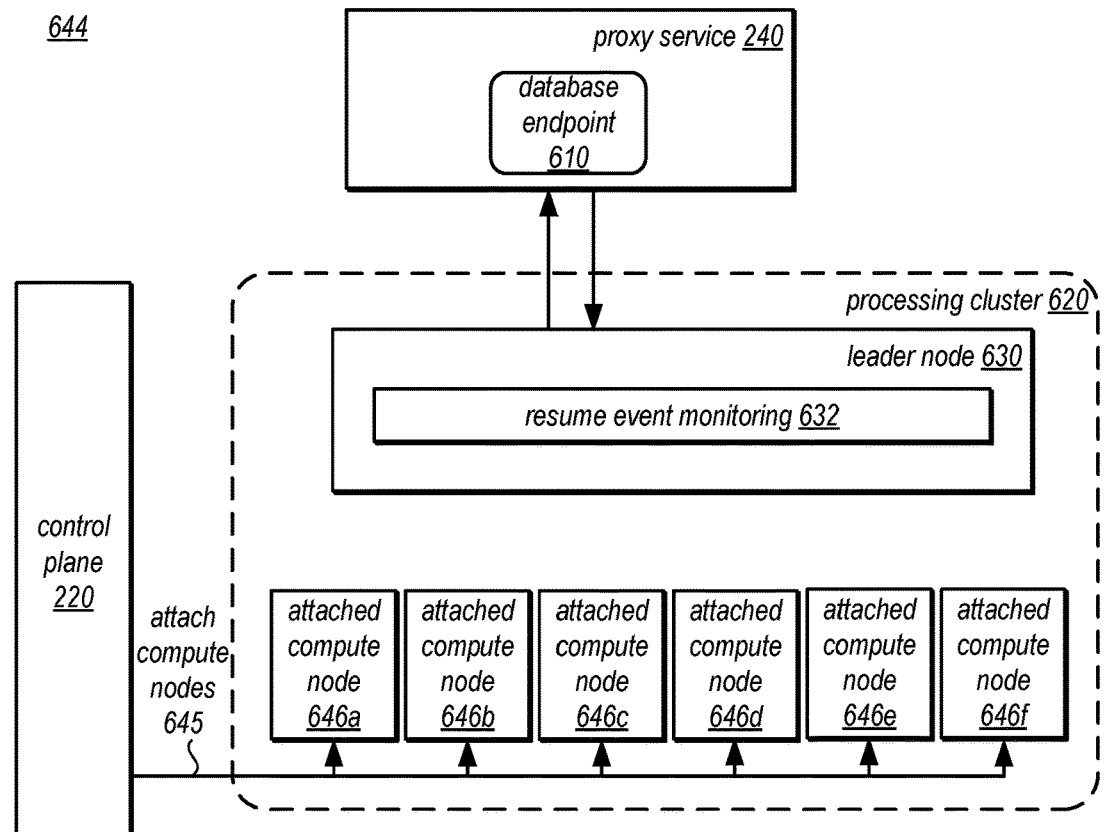

Pause events may be an opportunity to resize the processing cluster up or down. In FIG. 6B, an example of sizing up the cluster is given. Similar to FIG. 6A, in scene 642 processing cluster 620 may implement leader node 630, which may implement resume event monitoring (implementing techniques discussed below with regard to FIG. 9). As indicated at 634a, 634b, 634c, and 634d, a number of released compute nodes may have been previously implemented as part of processing cluster 620. Resume event monitoring 632 may send a request to obtain compute nodes, as indicated at 633. The requested compute nodes may be increased (e.g., 6 compute nodes). In scene 644, as indicated at 645, control plane 220 may attach the 6 compute nodes, 646a, 646b, 646c, 646d, 646e, and 646f, increasing the size of processing cluster 620. Similar techniques may be implemented to use a pause management action to down-size the cluster. Other reconfigurations, related to swapping nodes or modifying allocations, capabilities, or other processing cluster configurations could also be implemented, in some embodiments.

Figure 7:
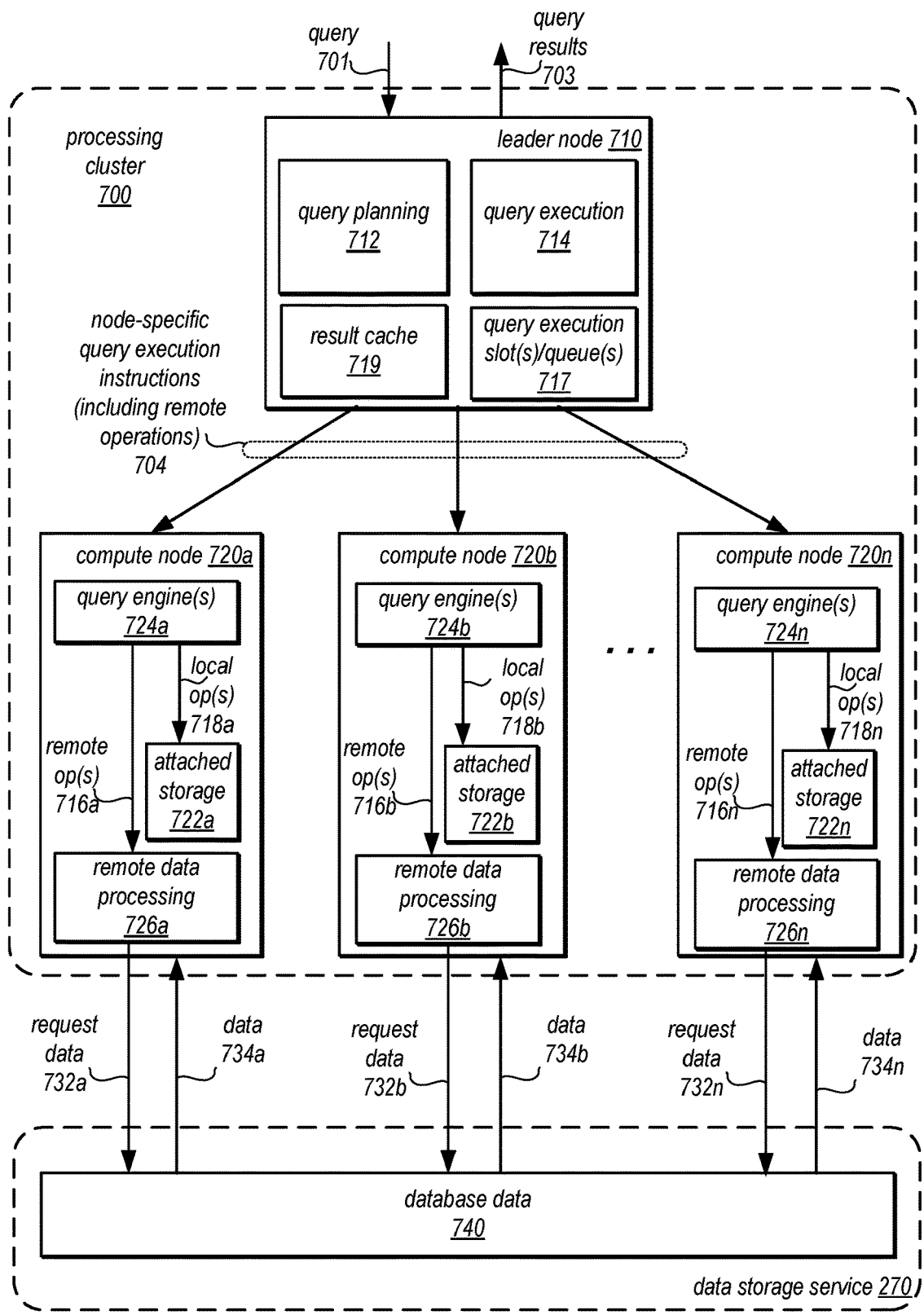
FIG. 7 is a logical block diagram illustrating an example of a processing cluster performing queries to database data, according to some embodiments.

FIG. 7 is a logical block diagram illustrating an example of a processing cluster performing queries to database data, according to some embodiments. As illustrated in this example, a processing cluster 700 may include a leader node 710 and compute nodes 720a, 720b, and 720n, which may communicate with each other over an interconnect (not illustrated). Leader node 710 may implement query planning 712 to generate query plan(s), query execution 714 for executing queries on processing cluster 700 that perform data processing that can utilize remote query processing resources for remotely stored data (e.g., by utilizing one or more query execution slot(s)/queue(s) 717). As described herein, each node in a primary processing cluster 700 may include attached storage, such as attached storage 722a, 722b, and 722n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 700 is a leader node as illustrated in FIG. 7, but rather different nodes of the nodes in processing cluster 700 may act as a leader node or otherwise direct processing of queries to data stored in processing cluster 700. While nodes of processing cluster may be implemented on separate systems or devices, in at least some embodiments, some or all of processing cluster may be implemented as separate virtual nodes or instance on the same underlying hardware system (e.g., on a same server).

Leader node 710 may manage communications with clients, such as clients 250 discussed above with regard to FIG. 2. As discussed above with regard to FIG. 3, leader node 710 may communicate with proxy service 240 and may receive query 701 and return query results 703 to proxy service 240 (instead of communicating directly with a client application).

Leader node 710 may be a node that receives a query 701 from various client programs (e.g., applications) and/or subscribers (users) (either directly or routed to leader node 710 from proxy service 240), then parses them and develops an execution plan (e.g., query plan(s)) to carry out the associated database operation(s)). More specifically, leader node 710 may develop the series of steps necessary to obtain results for the query. Query 701 may be directed to data that is stored both locally within processing cluster 700 (e.g., at one or more of compute nodes 720) and data stored remotely. Leader node 710 may also manage the communications among compute nodes 720 instructed to carry out database operations for data stored in the processing cluster 700. For example, node-specific query instructions 704 may be generated or compiled code by query execution 714 that is distributed by leader node 710 to various ones of the compute nodes 720 to carry out the steps needed to perform query 701, including executing the code to generate intermediate results of query 701 at individual compute nodes may be sent back to the leader node 710. Leader node 710 may receive data and query responses or results from compute nodes 720 in order to determine a final result 703 for query 701.

A database schema, data format and/or other metadata information for the data stored among the compute nodes, such as the data tables stored in the cluster, may be managed and stored by leader node 710. Query planning 712 may account for remotely stored data by generating node-specific query instructions that include remote operations to be directed by individual compute node(s). Although not illustrated, in some embodiments, a leader node may implement burst manager to send 706 a query plan generated by query planning 712 to be performed at another attached processing cluster and return results 708 received from the burst processing cluster to a client as part of results 703.

In at least some embodiments, a result cache 719 may be implemented as part of leader node 710. For example, as query results are generated, the results may also be stored in result cache 719 (or pointers to storage locations that store the results either in primary processing cluster 700 or in external storage locations), in some embodiments. Result cache 719 may be used instead of other processing cluster capacity, in some embodiments, by recognizing queries which would otherwise be sent to another attached processing cluster to be performed that have results stored in result cache 719. Various caching strategies (e.g., LRU, FIFO, etc.) for result cache 719 may be implemented, in some embodiments. Although not illustrated in FIG. 7, result cache 719 could be stored in other storage systems (e.g., other storage services, such as a NoSQL database) and/or could store sub-query results.

Processing cluster 700 may also include compute nodes, such as compute nodes 720*a*, 720*b*, and 720*n*. Compute nodes 720, may for example, be implemented on servers or other computing devices, such as those described below with regard to computer system 1000 in FIG. 10, and each may include individual query processing "slices" defined, for example, for each core of a server's multi-core processor, one or more query processing engine(s), such as query engine(s) 724*a*, 724*b*, and 724*n*, to execute the instructions 704 or otherwise perform the portions of the query plan assigned to the compute node. Query engine(s) 724 may access a certain memory and disk space in order to process a portion of the workload for a query (or other database operation) that is sent to one or more of the compute nodes 720. Query engine 724 may access attached storage, such as 722*a*, 722*b*, and 722*n*, to perform local operation(s), such as local operations 718*a*, 718*b*, and 718*n*. For example, query engine 724 may scan data in attached storage 722, access indexes, perform joins, semi joins, aggregations, or any other processing operation assigned to the compute node 720.

Query engine 724*a* may also direct the execution of remote data processing operations, by providing remote operation(s), such as remote operations 716*a*, 716*b*, and 716*n*, to remote data processing clients, such as remote data processing client 726*a*, 726*b*, and 726*n*. Remote data processing clients 726 may be implemented by a client library, plugin, driver or other component that sends request subqueries to be performed by data storage service 220 or requests to for data, 732*a*, 732*b*, and 732*n*. As noted above, in some embodiments, Remote data processing clients 726 may read, process, or otherwise obtain data 734*a*, 734*b*, and 734*c*, in response from database data 740 in data storage service 270, which may further process, combine, and or include them with results of location operations 718.

Compute nodes 720 may send intermediate results from queries back to leader node 710 for final result generation (e.g., combining, aggregating, modifying, joining, etc.). Remote data processing clients 726 may retry data requests 732 that do not return within a retry threshold.

Attached storage 722 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Although FIGS. 2-7 have been described and illustrated in the context of a provider network implementing a database service, like a data warehousing service, the various components illustrated and described in FIGS. 2-7 may be easily applied to other database services that can utilize detecting idle periods for management actions at processing clusters for managed databases. As such, FIGS. 2-7 are not intended to be limiting as to other embodiments of detecting idle periods for management actions at processing clusters for managed databases.

Figure 8:
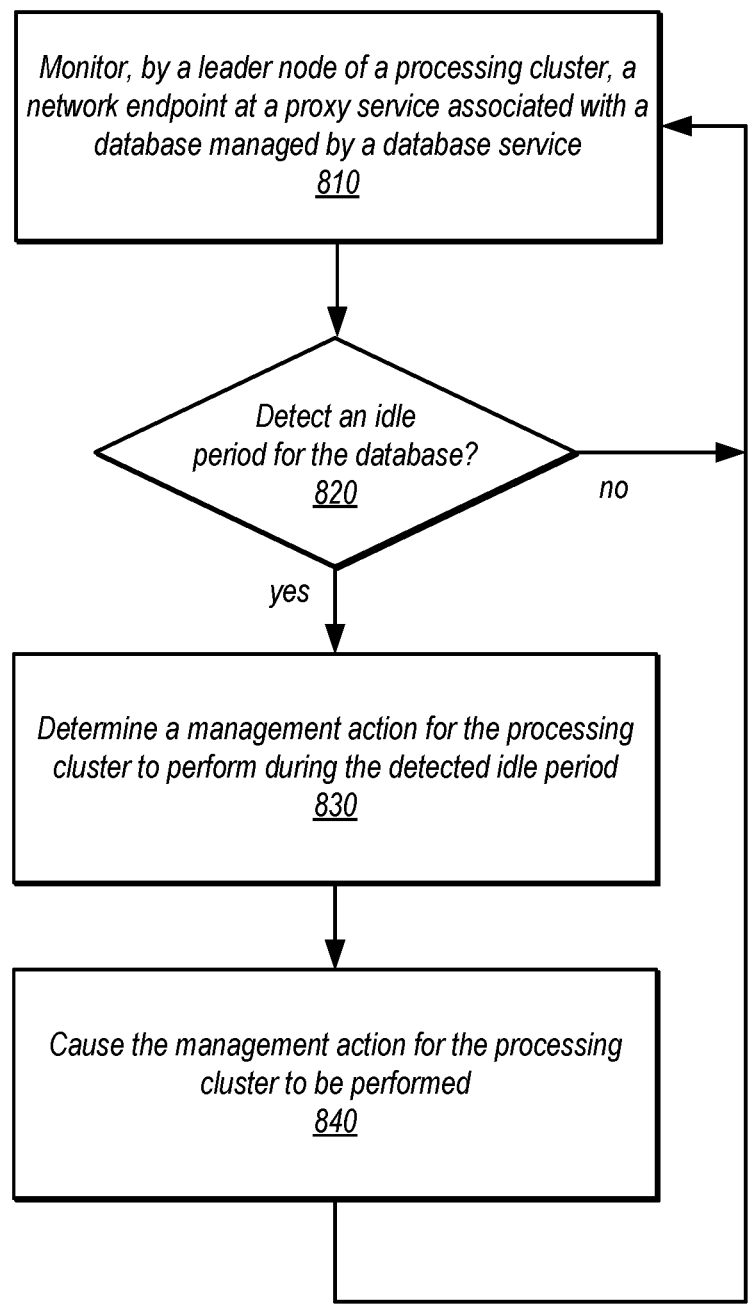
FIG. 8 is a high-level flowchart illustrating methods and techniques to implement detecting idle periods for management actions at processing clusters for managed databases, according to some embodiments.

FIG. 8 is a high-level flowchart illustrating methods and techniques to implement detecting idle periods for management actions at processing clusters for managed databases, according to some embodiments. Various different systems and devices may implement the various methods and techniques described below, either singly or working together. Different combinations of services implemented in different provider networks operated by different entities may implement some or all of the methods (e.g., a data warehouse cluster in a service of a first provider network and a data set stored in a service of a second provider network). Different types of query engines or non-distributed query performance platforms may implement these techniques. Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

As indicated at 810, a leader node of a processing cluster may monitor a network endpoint at a proxy service associated with a database managed by a database service, according to some embodiments. For example, the leader node may track the activity of connections with the proxy service (e.g., by requesting active connections or other information). In some embodiments, monitoring may include tracking operations like cursors, pagination, or other indicators of progress on various operations (e.g., returning results) from the processing cluster.

A network endpoint may be a network address or other location for which database service may implement networking resources to listen and obtain the query. By sending the query to the network endpoint, the target of the query, the database, may be identified. In some embodiments, the network endpoint may be provided (e.g., to a user for inclusion in client applications) when the database is created. In at least some embodiments, the database may be created, configured, or modified to be managed by the database service, such that automatic management techniques, including providing a "serverless" management experience for a user of the database is performed. For example, the database may be created without any specified number or other configuration of computing resources used to process queries (or provide other access to) the database. Instead, an initial query processing resource configuration may be automatically selected by the database service for the database, according to various techniques (e.g., using a pre-defined initial query processing resource configuration or using prediction techniques to determine the initial query processing resource configuration based on other information, such as an amount or type of data stored in the database).

As indicated at 820, monitoring of the network endpoint may be performed to detect an idle period for the database. If not, then monitoring may continue. Different types of idle periods may be monitored for different types of management actions. For example, long idle periods or indications of no active connections may trigger detection of an idle period for a longer running management action, such as software patch installation, data redistribution, or pausing the processing cluster. Shorter or other indications of idle periods may trigger detection of idle periods for actions like updating or creating a materialized view, and so on.

As indicated at 830, a management action may be determined for the processing cluster to perform during the detected idle period, in some embodiments. For example, specific idle periods may map to specific management actions. In some embodiments, multiple different management actions could be performed, therefore a priority scheme may be applied (e.g., security, then service interruptions, then performance optimizations, or some other hierarchy of categories of actions). As indicated at 840, the management action may be caused for the processing cluster to be performed, in some embodiments. For example, as depicted in FIGS. 4-5, operations may be instructed to compute nodes in the processing cluster, or actions to release the compute nodes and pause the processing cluster may be performed. As indicated by the arrow looping back to 810, this technique may be continually performed such that the same idle period (or new one) may allow for another management action to be determined and performed.

Figure 9:
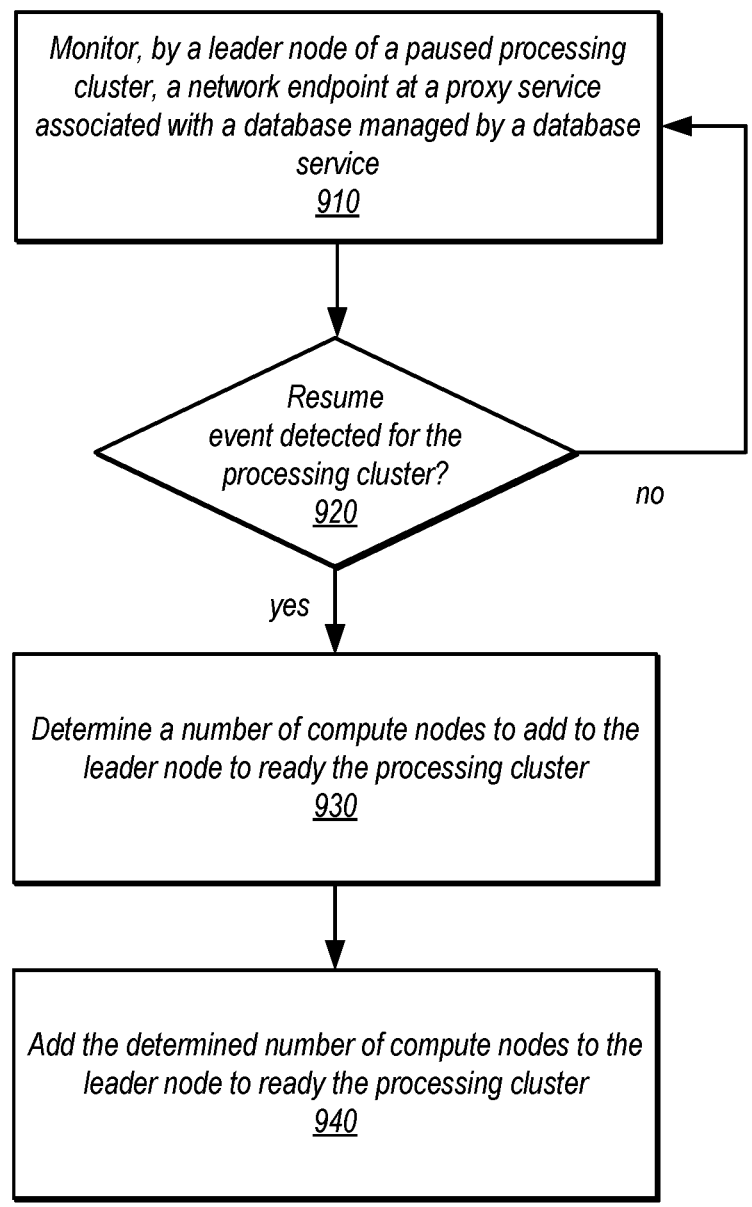
FIG. 9 is a high-level flowchart illustrating methods and techniques to implement resuming a paused processing cluster for a managed database, according to some embodiments.

FIG. 9 is a high-level flowchart illustrating methods and techniques to implement predicting response time for queries on different query processing configurations, according to some embodiments. As indicated at 910, a leader node of a paused processing cluster, may monitor a network endpoint at a proxy service associated with at database managed by the database service. As indicated at 920, a resume event may be detected for the processing cluster. For example, a query may be received and the proxy may send the query to the leader node of the paused processing cluster. In some embodiments, a resume event may be a resume instruction or command sent by a control plane or proxy service (e.g., in anticipation of impending queries).

As indicated at 930, a number of compute nodes to add to the processing cluster may be determined, in some embodiments. For example, a resize event that was detected for the processing cluster may be found and evaluated to determine what size the resumed processing cluster should be. In some embodiments, an analysis of performance prior to the pause may be performed to determine whether a different number of compute nodes (e.g., more or less) should be used. As indicated at 940, the determined number of compute nodes may be added to the leader node to ready the processing cluster, in some embodiments.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of detecting idle periods for management actions at processing clusters for managed databases as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
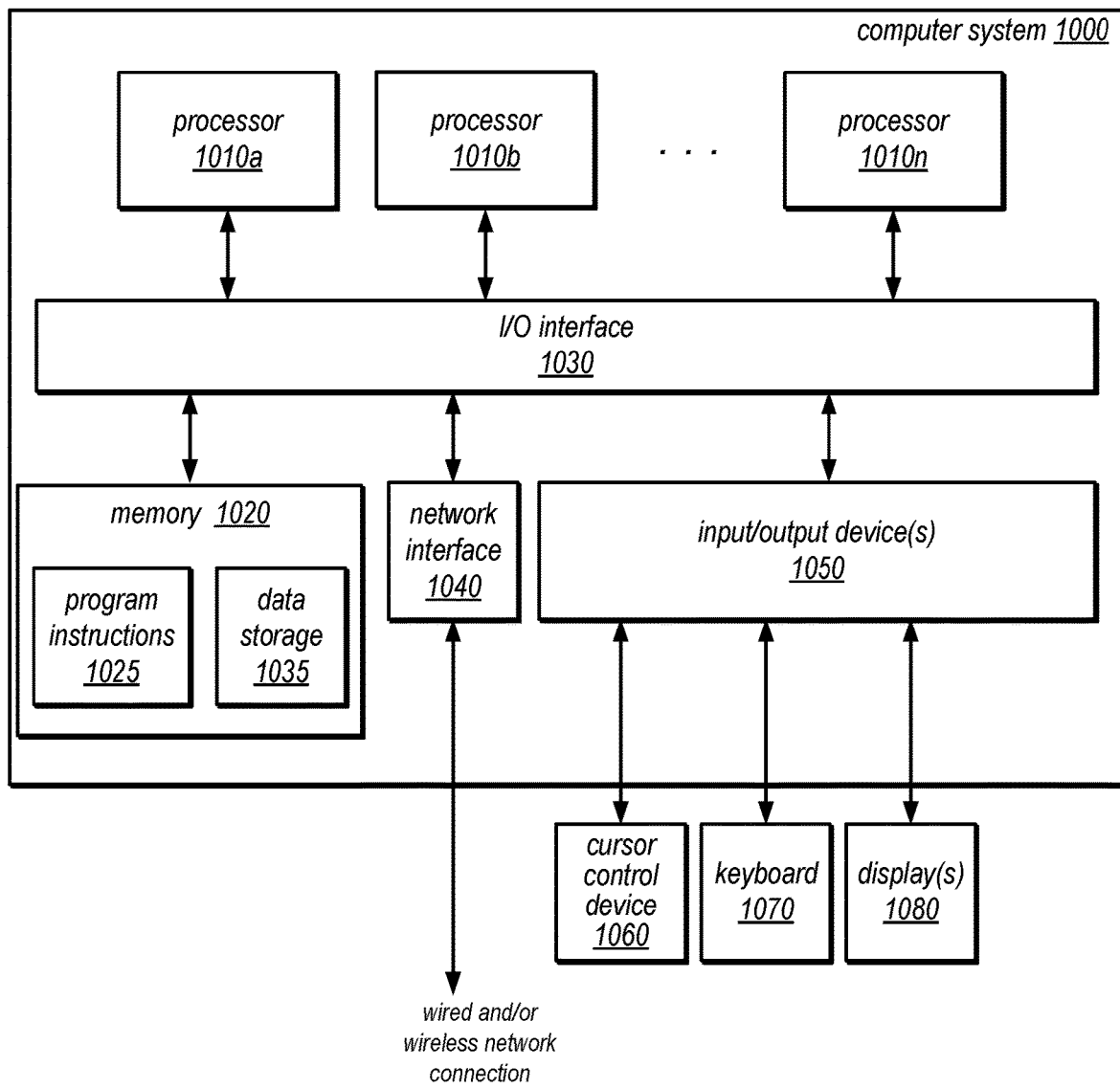
FIG. 10 illustrates an example system that implements the various methods, techniques, and systems described herein, according to some embodiments.

As shown in FIG. 10, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more computing devices, respectively comprising a processor and a memory that implement a processing cluster for a database service, the processing cluster comprising a leader node and one or more compute nodes, wherein the leader node implements query planning and execution to instruct the one or more compute nodes in accordance with a query plan generated by the leader node, and wherein the leader node in the processing cluster is configured to:
   monitor information indicative of client activity received via a network endpoint at a proxy service associated with a database managed by the database service to detect an idle period for the database, wherein the processing cluster including the leader node receives client requests from the proxy service that are directed to the database over a network;
   select from a plurality of different management actions a management action for the processing cluster to perform during the detected idle period for the database according to the detected idle period; and
   send one or more requests to cause the management action for the processing cluster to be performed, wherein the database is available for read requests received via the network endpoint during performance of the management action by another processing cluster of the database service.

2. The system of claim 1, wherein to send the one or more requests to cause the management action for the processing cluster to be performed, the leader node is configured to send one or more requests to cause a software patch to be installed at the processing cluster.

3. The system of claim 1, wherein to send the one or more requests to cause the management action for the processing cluster to be performed, the leader node is configured to send one or more requests to release the one or more compute nodes for other tasks of the database service and pause the processing cluster.

4. The system of claim 3, wherein the leader node is further configured to:
   detect a resume event for the processing cluster;
   determine a number of compute nodes to add to the processing cluster; and
   cause the determined number of compute nodes to be added to the processing cluster.

5. A method, comprising:
monitoring, by a leader node of a processing cluster that implements query planning and execution to instruct one or more compute nodes in accordance with a query plan generated by the leader node to perform a query to a database, information indicative of client activity received via a network endpoint at a proxy service associated with the database managed by a database service to detect an idle period for the database, wherein the processing cluster including the leader node receives client requests from the proxy service that are directed to the database over a network;
determining, by the leader node, a management action for the processing cluster to perform during the detected idle period for the database; and
causing, by the leader node, the management action for the processing cluster to be performed, wherein the database is available for read requests received via the network endpoint during performance of the management action by another processing cluster of the database service.

6. The method of claim 5, wherein causing the management action for the processing cluster to be performed, comprises causing a software patch to be installed at the processing cluster.

7. The method of claim 5, wherein causing the management action for the processing cluster to be performed, comprises causing a vacuum operation to consolidate storage space for one or more records of the database left as a result of one or more deletions performed on the database.

8. The method of claim 5, further comprising performing a metadata query at the leader node when the processing cluster is paused as a result of the management action.

9. The method of claim 5, wherein causing the management action for the processing cluster to be performed, comprises sending one or more requests to release one or more compute nodes of the processing cluster for other tasks of the database service and pause the processing cluster.

10. The method of claim 9, further comprising:
detecting a resume event for the processing cluster;
determining a number of compute nodes to add to the processing cluster; and
causing the determined number of compute nodes to be added to the processing cluster.

11. The method of claim 10, wherein the determined number of compute nodes is different than a number of compute nodes released from the processing cluster when the processing cluster was paused.

12. The method of claim 5, wherein the determined management action is received at the leader node from a control plane of the database service.

13. The method of claim 5, wherein causing the management action for the processing cluster to be performed, comprises causing a materialized view for the database to be created or updated.

14. One or more non-transitory, computer-readable storage media, storing program instructions that when executed on or across one or more computing devices cause the one or more computing devices to implement:
monitoring, by a leader node of a processing cluster that implements query planning and execution to instruct one or more compute nodes in accordance with a query plan generated by the leader node to perform a query to a database, a network endpoint at a proxy service associated with the database managed by a database service to detect an idle period for the database, monitoring, by a leader node of a processing cluster that implements query planning and execution to instruct one or more compute nodes in accordance with a query plan generated by the leader node to perform a query to a database, information indicative of client activity received via a network endpoint at a proxy service associated with the database managed by a database service to detect an idle period for the database, wherein the processing cluster including the leader node receives client requests from the proxy service that are directed to the database over a network, and wherein the database was created in response to a request that specified that the database was to be managed by the database service;
determining, by the leader node, a management action for the processing cluster to perform during the detected idle period for the database; and
causing, by the leader node, the management action for the processing cluster to be performed, wherein the database is available for read requests received via the network endpoint during performance of the management action.

15. The one or more non-transitory, computer-readable storage media of claim 14, wherein, in causing the management action for the processing cluster to be performed, the program instructions cause the one or more computing devices to implement causing a software patch to be installed at the processing cluster.

16. The one or more non-transitory, computer-readable storage media of claim 14, wherein, in causing the management action for the processing cluster to be performed, the program instructions cause the one or more computing devices to implement causing a redistribution of database data amongst one or more compute nodes of the processing cluster.

17. The one or more non-transitory, computer-readable storage media of claim 14, wherein another processing cluster performs a query to the database when the processing cluster is paused as a result of the management action.

18. The one or more non-transitory, computer-readable storage media of claim 14, wherein, in causing the management action for the processing cluster to be performed, the program instructions cause the one or more computing devices to implement sending one or more requests to release one or more compute nodes of the processing cluster for other tasks of the database service and pause the processing cluster.

19. The one or more non-transitory, computer-readable storage media of claim 18, storing further instructions that when executed on or across the one or more computing devices, cause the one or more computing devices to implement:
detecting a resume event for the processing cluster;
determining a number of compute nodes to add to the processing cluster; and
causing the determined number of compute nodes to be added to the processing cluster.

20. The one or more non-transitory, computer-readable storage media of claim 14, storing further instructions that when executed on or across the one or more computing devices, cause the one or more computing devices to implement causing a second determined management action to be performed during the idle period.

* * * * *